United States Patent
Hao et al.

(10) Patent No.: US 12,334,608 B1
(45) Date of Patent: Jun. 17, 2025

(54) DEVICE AND METHOD FOR EVALUATING HEAT CAPACITY OF TEST PLATFORM OF HYDROGEN FUEL CELL SYSTEM

(71) Applicants: CATARC NEW ENERGY VEHICLE TEST CENTER (TIANJIN) CO., LTD., Tianjin (CN); CHINA AUTOMOTIVE TECHNOLOGY AND RESEARCH CENTER CO., LTD., Tianjin (CN)

(72) Inventors: Dong Hao, Tianjin (CN); Yanyi Zhang, Tianjin (CN); Zhixin Wu, Tianjin (CN); Xuan Liu, Tianjin (CN); Minghui Ma, Tianjin (CN); Guang Chen, Tianjin (CN); Jicheng Ma, Tianjin (CN); Xiangyang Chen, Tianjin (CN); Xin Zhao, Tianjin (CN); Zirong Yang, Tianjin (CN); Daokuan Jiao, Tianjin (CN)

(73) Assignees: CATARC NEW ENERGY VEHICLE TEST CENTER (TIANJIN) CO., LTD., Tianjin (CN); CHINA AUTOMOTIVE TECHNOLOGY AND RESEARCH CENTER CO., LTD., Tianjin (CN)

( * ) Notice: Subject to any disclaimer, the term of this patent is extended or adjusted under 35 U.S.C. 154(b) by 0 days.

(21) Appl. No.: 19/037,664

(22) Filed: Jan. 27, 2025

(30) Foreign Application Priority Data

Feb. 1, 2024 (CN) .................... 202410140668.X (51) Int. Cl.
*H01M 8/04* (2016.01)
*H01M 8/0432* (2016.01)

(52) U.S. Cl.
CPC ... *H01M 8/04373* (2013.01); *H01M 8/04358* (2013.01)

(58) Field of Classification Search
CPC ............... H01M 8/04373; H01M 8/04358
See application file for complete search history.

(56) References Cited

U.S. PATENT DOCUMENTS

2006/0115693 A1* 6/2006 Toth ............... H01M 8/04992
429/444

FOREIGN PATENT DOCUMENTS

| CN | 106505229 A | 3/2017 |
| CN | 108539224 A | 9/2018 |

(Continued)

OTHER PUBLICATIONS

Decision to Grant a Patent in Chinese Application No. 202410140668.X mailed on Mar. 16, 2024, 7 pages.

*Primary Examiner* — Olatunji A Godo
(74) *Attorney, Agent, or Firm* — Porus IP LLC (57) ABSTRACT

The present disclosure relates to a device and a method for valuating a heat dissipation capability of a test platform of hydrogen fuel cell system. A plurality of PTC heaters are connected in series or in parallel in a primary or secondary dispersion water loop to simulate the fuel cell system with different heating powers. A rotation speed of water pump and whether a PTC is operated are controlled, thereby implementing steady and dynamic tests, and a test for integrative operating condition, thereby avoiding a real machine test from controlling a plurality of parameters. Compared with the real machine of a fuel cell, it can better test the heat dissipation capability of the fuel cell system. During the operation, the device does not need to be supplied reaction gases to ensure the safety of the test. The primary and secondary dispersion tests can be performed separately or in parallel.

8 Claims, 6 Drawing Sheets

(56) References Cited

FOREIGN PATENT DOCUMENTS

| CN | 109738223 A | 5/2019 |
|---|---|---|
| CN | 110686900 A | 1/2020 |
| CN | 210638898 U | 5/2020 |
| CN | 211427169 U | 9/2020 |
| CN | 112098854 A | 12/2020 |
| CN | 212461750 U | 2/2021 |
| CN | 213301702 U | 5/2021 |
| CN | 113252349 A | 8/2021 |
| CN | 216054825 U | 3/2022 |
| CN | 114361511 A | 4/2022 |

* cited by examiner

DEVICE AND METHOD FOR EVALUATING HEAT CAPACITY OF TEST PLATFORM OF HYDROGEN FUEL CELL SYSTEM

CROSS-REFERENCE TO RELATED APPLICATIONS

This application claims priority of Chinese Application No. 202410140668.X, filed on Feb. 1, 2024, the entire contents of which are incorporated herein by reference.

TECHNICAL FIELD

The present disclosure relates to the field of fuel cell test, and specifically, relates to a device and a method for evaluating a heat dissipation capability of a test platform of hydrogen fuel cell system.

BACKGROUND

Fuel cells are considered to be one of the new environmentally friendly and efficient power generation technologies in the 21st century because of their diversified fuels, low noise, low pollution to the environment, good maintenance, and high reliability. The fuel cells may be used as an engine in a vehicle, a submarine, an aircraft, or the like. A test platform of fuel cell system is the basis for the development of the fuel cell system. It can test the output performance of the fuel cell system under different operating conditions, so as to test the component performance, evaluate the life of fuel cells, verify a controlling manner, or the like, greatly shortening the R&D cycle, and reducing the development cost.

An important function of the test platform of fuel cell system is to control the temperature by dissipating heat in the engine. During the development of the test platform, the heat dissipation capability of the test platform needs to be evaluated. If the fuel engine is directly used for the test, it is necessary to supply fuel to generate electricity and heat, which is rather expensive. In addition, in the early development of the test platform, there is a certain risk to such a test in a real machine. Therefore, a device needs to be designed to simulate the heat generation of the fuel cell system under different operating conditions, and test the heat dissipation capability of the fuel cell system. Simple and convenient setting of operating conditions, good simulation effect, and strong expansibility are important indexes of the device for evaluating a heat dissipation capability of a test platform of hydrogen fuel cell system.

SUMMARY

According to a first aspect of the present disclosure, the present disclosure requests to protect a device for evaluating a heat dissipation capability of a test platform of hydrogen fuel cell system, comprising:
  a test stand of a fuel cell system and a simulated heating device; wherein
  the test stand of the fuel cell system includes a primary test stand 1 of the fuel cell system, a water inlet 2 of a primary dispersion system, a water outlet 3 of the primary dispersion system, a water outlet 4 of a secondary dispersion system, and a water inlet 5 of the secondary dispersion system;
  the simulated heating device includes a liquid transmission pipeline 6, a water pump 7, a plurality of PTC heaters 8, a relay power supply 9, one or more switches 10, an electrical signal transmission line 11, a plurality of electromagnetic relays 12, a PTC power supply 13, and an expansion water tank 14;
  the device for evaluating a heat dissipation capability performs a primary heat dissipation capability test and a secondary heat dissipation capability test;
  when the primary heat dissipation capability test is performed, a cooling medium is supplied to the PTC heaters 8 through the liquid transmission pipeline 6 by the water pump 7 and is heated, the heated cooling medium is transferred to the water inlet 2 of the primary dispersion system of the test stand of fuel cell system through the liquid transmission pipeline 6, and is heat-dissipated by the primary dispersion system of the primary test stand 1 of fuel cell system, wherein in a primary dispersion water channel, gas is removed from the water channel and a water level warning is provided through a branch water channel of the expansion water tank 14;
  when the secondary heat dissipation capability test is performed,
  the cooling medium is supplied to the PTC heaters 8 through the liquid transmission pipeline 6 by a built-in water pump in the primary test stand 1 of the fuel cell system and is heated, wherein the heated cooling medium is transferred to the water inlet 5 of the secondary dispersion system through the liquid transmission pipeline 6, and is heat-dissipated by the secondary dispersion system of the primary test stand 1 of the fuel cell system;
  wherein the PTC heaters 8 in the primary heat dissipation capability test and the secondary heat dissipation capability test are powered by the PTC power supply 13;
  the PTC heaters 8, the PTC power supply 13, and the electromagnetic relays 12 are connected in series;
  wherein the switches 10 control on/off of the electromagnetic relays 12 to determine whether the PTC heaters 8 work and whether the cooling medium is heated; and
  wherein each of the plurality of PTC heaters 8 is provided with one switch 10 and one electromagnetic relay 12, so as to independently control the PTC heater 8;
  wherein the plurality of PTC heaters which are connected in series or in parallel simulate the fuel cell system with different heating powers, and operating states of the plurality of PTC heaters 8 are controlled by using the switches to simulate operating conditions under low, medium, and high powers and operating conditions under small, medium, and large variable load amplitudes for the fuel cell system.

DETAILED DESCRIPTION

Figure 1:
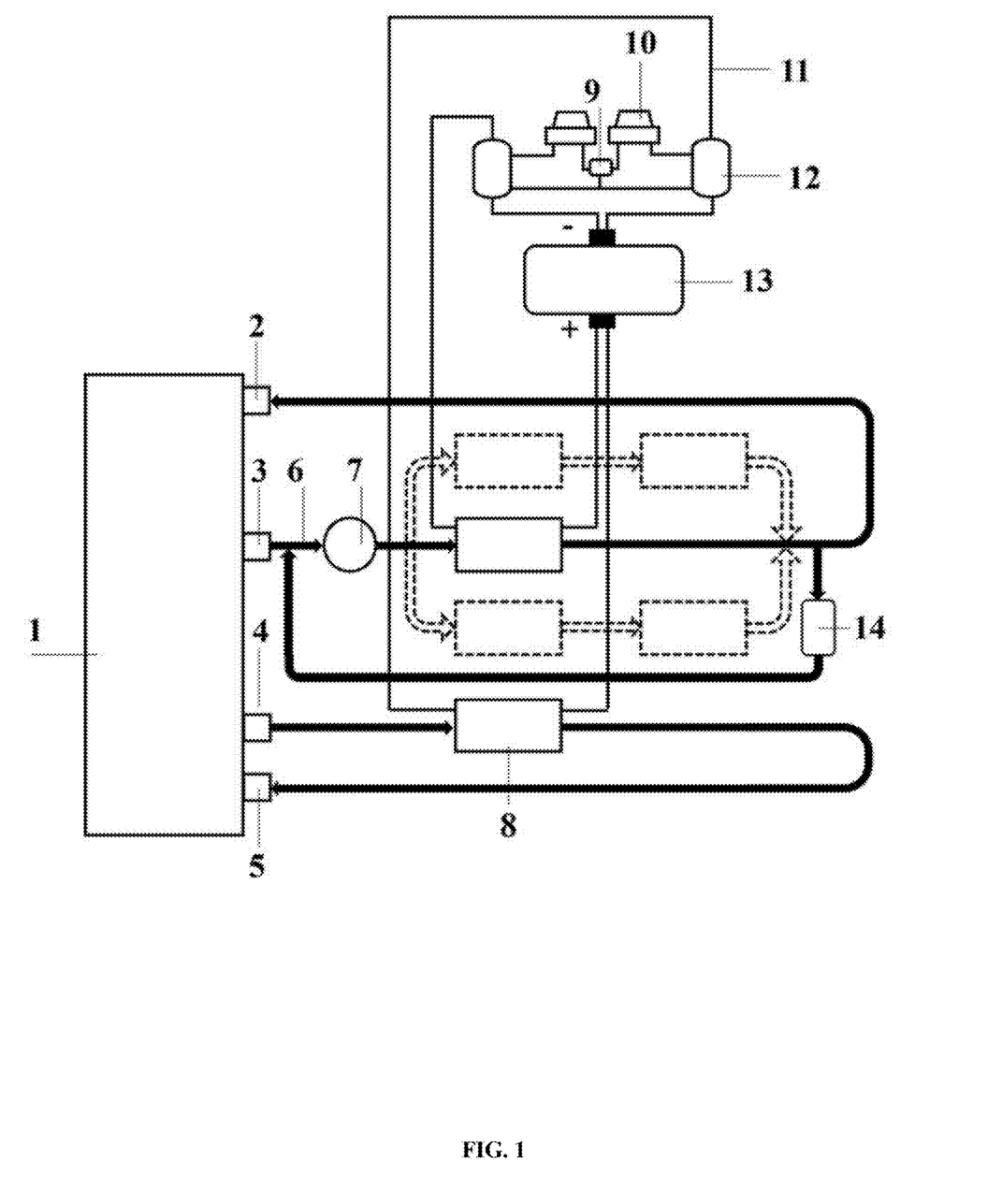
FIG. 1 is a schematic structural diagram of a device for evaluating a heat dissipation capability of a test platform of hydrogen fuel cell system according to some embodiments of the present disclosure.

Referring to FIG. 1, some embodiments of the present disclosure provide a device for evaluating a heat dissipation capability of a test platform of hydrogen fuel cell system, including: a test stand of fuel cell system and a simulated heating device. The test stand of fuel cell system may be a test stand of hydrogen fuel cell system that is required to be evaluated for heat dissipation capability. The test stand is heated by using a simulated heat generating device to test the heat dissipation capability of the test stand of hydrogen fuel cell system.

The test stand of fuel cell system includes a primary test stand 1 of fuel cell system, a water inlet 2 of a primary dispersion system, a water outlet 3 of the primary dispersion system, a water outlet 4 of a secondary dispersion system, and a water inlet 5 of the secondary dispersion system. The water inlet 2 of the primary dispersion system, the water outlet 3 of the primary dispersion system, the water outlet 4 of the secondary dispersion system, and the water inlet 5 of the secondary dispersion system are connected to the primary test stand 1 of fuel cell system, respectively. The water inlet 2 of the primary dispersion system and the water outlet 3 of primary dispersion system are connected by a water channel (or referred as to a pipeline connection), and the water outlet 4 and the water inlet 5 of the secondary dispersion system are connected by the water channel.

The simulated heating device includes a liquid transmission pipeline 6, a water pump 7, a plurality of PTC heaters 8, a relay power supply 9, one or more switches 10, an electrical signal transmission line 11, a plurality of electromagnetic relays 12, a PTC power supply 13, and an expansion water tank 14. The liquid transmission pipeline 6, the water pump 7, the PTC heaters 8 and the expansion water tank 14 are connected by the water channel. A cooling medium is provided in the water channel. The relay power supply 9, the switches 10, the electrical signal transmission line 11, the electromagnetic relays 12, and the PTC power supply 13 are electrically connected to the PTC heaters 8.

The test stand of fuel cell system includes a primary dispersion system (or referred as to a primary dispersion) and a secondary dispersion system (or referred as to a secondary dispersion), so as to realize a two-phase heat dissipation in the fuel cell system. The device for evaluating a heat dissipation capability is configured to perform a primary heat dissipation capability test and a secondary heat dissipation capability test.

In some embodiments, when the primary heat dissipation capability test is performed,
a cooling medium is supplied to the PTC heaters 8 through the liquid transmission pipeline 6 by the water pump 7 and is heated. The heated cooling medium is then transferred to the water inlet 2 of primary dispersion system of the test stand of the fuel cell system through the liquid transmission pipeline 6, and is heat-dissipated by the primary dispersion system 1 of the primary test stand of fuel cell system. The expansion water tank 14 may accommodate the expansion of the cooling medium in the primary dispersion water channel. The expansion water tank 14 includes a branch water channel. In the primary dispersion water channel, gas is removed from the water channel and a water level warning is provided through the branch water channel of the expansion water tank 14.

In some embodiments, when the secondary heat dissipation capability test is performed,
the cooling medium is supplied to the PTC heaters 8 through the liquid transmission pipeline 6 by a built-in water pump in the primary test stand of the fuel cell system 1 and is heated. The heated cooling medium is then transferred to the water inlet 5 of the secondary dispersion system through the liquid transmission pipeline 6, and is heat-dissipated by the secondary dispersion system of the primary test stand 1 of the fuel cell system.

In some embodiments, more information about performing the primary and secondary heat dissipation capability tests by the device for evaluating the heat dissipation capability may be referred to the description of the method for evaluating the heat dissipation capability in the following. In some embodiments, the PTC heaters 8 in the primary heat dissipation capability test and the secondary heat dissipation capability test are powered by the power supply 13.

The PTC heaters 8, the power supply 13, and the electromagnetic relays 12 are connected in series.

The switches 10 control on/off of the electromagnetic relays 12 to determine whether the PTC heaters 8 work or whether the cooling medium is heated.

Each PTC heater 8 is provided with one switch 10 and one electromagnetic relay 12, so as to independently control each PTC heater 8.

A plurality of PTC heaters that are connected in series or in parallel may simulate the fuel cell system with different heating power. Operating states of the plurality of PTC heaters 8 are controlled by the switches to simulate operating conditions under low, medium, and high powers and operating conditions under small, medium, and large variable load amplitudes for the fuel cell system. For more information about simulating operating conditions under low, medium, and high powers and operating conditions under small, medium, and large variable load amplitudes for the fuel cell system by the plurality of PTC heaters 8 may be referred to the description in the following.

The device for evaluating a heat dissipation capability of a test platform of hydrogen fuel cell system provided in some embodiment may simulate the fuel cell system with different heating powers by connecting a plurality of PTC heaters in series or parallel (as shown in the dotted line diagram in FIG. 1) in the primary or secondary dispersion water channel. Operating states of a certain count of PTC heaters are controlled by the switches, so as to simulate operating conditions under low, medium, and high powers and operating conditions under small, medium, and large variable load variables for the fuel cell system. It realizes the testing of steady state, dynamic and integrative operating conditions, avoiding the control of a plurality of parameters such as cathode and anode humidity, pressure, flow rate, etc., in the test of the real machine. In addition, due to the fast response of the PTC heater, it can better realize the test of heat dissipation capability of the test stand of fuel cell system compared with the real machine of the fuel cell. During operation, the device does not need to supply reaction gases, such as oxygen and hydrogen, to ensure the safety of the test. The primary and secondary dispersion tests can be performed separately or in parallel, which avoids that the primary dispersion has to be turned on when the secondary dispersion is tested in the real machine, which results in a waste of resources.

Figure 2:
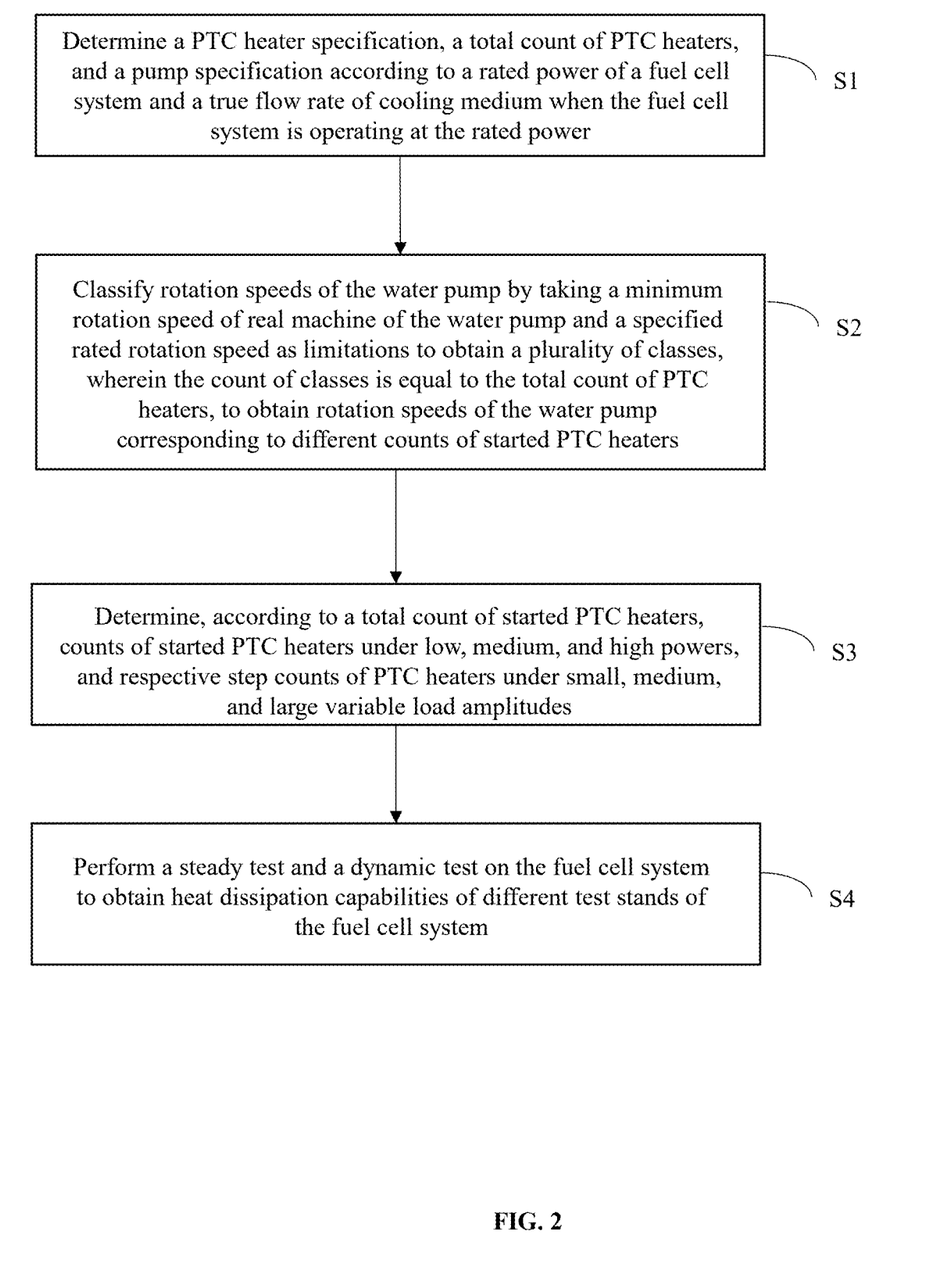
FIG. 2 is a flowchart of a working process for evaluating a heat dissipation capability of a test platform of hydrogen fuel cell system according to some embodiments of the present disclosure.

Referring to FIG. 2, some embodiments of the present disclosure further provide a method for evaluating a heat dissipation capability of a test platform of a hydrogen fuel cell system. The method is applied to the foregoing device for evaluating a heat dissipation capability of a test platform of a hydrogen fuel cell system. The method includes the following operations.

S1. Determine a PTC heater specification, a total count of PTC heaters, and a pump specification according to a rated power of the fuel cell system and a true flow rate of cooling medium when the fuel cell system is operating at the rated power. The rated power of the fuel cell system and the true flow rate of cooling medium when the fuel cell system are inherent property of the fuel cell system and may be obtained by consulting the technical documentation. More information about determining the PTC heater specification, the total count of PTC heaters, and the pump specification may be referred to the description in the following (e.g., S11~S12).

S2. Classify rotation speeds of the water pump by taking a minimum rotation speed of real machine of the water pump and a specified rated rotation speed as limitations to obtain a plurality of classes, wherein the count of classes is equal to the total count of PTC heaters, to obtain rotation speeds of the water pump corresponding to different counts of started PTC heaters. More information about the water pump, the minimum rotation speed, the rated rotation speed of the water pump, and obtain respective rotation speeds of the water pump corresponding to different counts of started PTC heaters may be referred to the description in the following.

S3. Determine, according to a total count of started PTC heaters, counts of started PTC heaters under low, medium, and high powers, and respective step counts of PTC heaters under small, medium, and large variable load amplitudes. More information about the counts of started PTC heaters under different powers and the step counts of PTC heaters under different variable load amplitudes may be referred to the description in the following.

S4. Perform a steady test and a dynamic test on the fuel cell system to obtain heat dissipation capabilities of different test stands of the fuel cell system. More information about the steady test and the dynamic test may be referred to the description in the following (e.g., S41~S42).

In some embodiments, in step S1, the method further includes:

S11, determine the PTC heater specification and the total count of PTC heaters according to the rated power of the fuel cell system. In some embodiments, the heat production capacity of the PTC heater is no less than the rated power of the fuel cell system.

S12, determine the water pump specification according to ae true flow rate of cooling medium when the fuel cell system is operating at a rated power.

In some embodiments, the step S11 further includes:

obtaining the rated power of the fuel cell system, and obtaining a plurality of reference specifications of the PTC heaters. The reference specifications of the PTC heaters may be obtained directly from the technical documentation.

Assuming that the PTC heater includes only one specification, N first PTC heaters of a first specification are used, and a heating power of the first PTC heaters is M.

A value of N*M is greater than or equal to the rated power of the fuel cell system.

In some embodiments, if the PTC heater includes a plurality of specifications, the total heating power of the plurality of specifications of PTC heaters may be controlled to be greater than or equal to the rated power of the fuel cell system.

In some embodiments, step S12 further includes:

obtaining a range of flow rate of true cooling medium when the fuel cell system is under the rated power and a temperature difference between an inlet and an outlet is a preset temperature difference value, and selecting a water pump of second specification from water pumps of reference specification. The range of flow rate of true cooling medium may be determined from the technical documentation. The specific value of the temperature difference between the inlet and outlet may be calculated from the temperatures obtained by sensors provided at the inlet and outlet.

The rated flow rate of the water pump of the second specification is a middle value in the range of the flow rate, for example, a middle value between a minimum value and a maximum value of the range of the flow rate when the fuel cell system is under the rated power and the temperature difference between the inlet and the outlet is the preset temperature difference value. In some embodiments, the preset temperature difference value may be determined manually based on experience.

For example, aiming to simulate a fuel cell engine of 120 KW, a primary heat dissipation capability of the test platform of hydrogen fuel cell system is tested. During the test, to ensure that the water pump meets the operation requirements, the specification of the water pump must be determined first. The device uses a dedicated liquid cooling pump of hydrogen fuel cell stack. According to actual machine data, when a temperature difference between an inlet and an outlet of a cooling medium of the fuel cell engine of 120 KW is 10° C., a range of flow rate is 150-170 L/min. Therefore, a water pump with a rated flow rate of 16 0 L/min is used (selecting an intermediate value, which takes into account performance and cost). At the same time, the fuel cell engine of 120 KW is simulated by using six PTC heaters with a heating power of 24 KW (about 20 KW in the actual machine).

In some embodiments, step S2 further includes:

according to a specified minimum rotation speed A of the water pump and a specified rated rotation speed B, setting that the water pump supplies a stable flow rate when an actual rotation speed of the water pump on a rack is greater than or equal to p*A and less than B, where, p is a real number greater than or equal to 1. The specified minimum rotation speed and the specified rated rotation speed of the water pump may be determined from the technical documentation, or from actual tests. The testing method for the water pump may be referred to the description in the following.

The rotation speeds are classified within an actual rotation speed range of the water pump, and the count of classes is equal to the total count of PTC heaters, to obtain the rotation speeds of the water pump corresponding to different counts of started PTC heaters. For example, when the total count of PTC heaters is 6, the actual rotation speed range of the water pump may be divided into 6 levels, and the actual rotation speed range of the water pump may be obtained by taking the lowest rotation speed A of the water pump as the minimum value and the rated speed B of the water pump as the maximum value.

For example, assuming that a minimum rotation speed of the water pump from the factory is 1000 rpm. However, according to a test, a stable flow rate may be supplied only when a rotation speed of the water pump on this rack is 2000 rpm due to a flow resistance. Therefore, the minimum rotation speed is set to 2000 rpm, and the rated rotation speed of the water pump is set to 4750 rpm. To ensure safe and reliable operation of the water pump, the maximum rotation speed of the actual machine is set to 4540 rpm. Within the range of 2000-4540 rpm, the rotation speed of the water pump is classified to six classes, corresponding to scenarios for activating 1 to 6 PTC heaters, respectively. Accordingly, the rotation speed is 2000 rpm, 2550 rpm, 3070 rpm, 3590 rpm, 4050 rpm, and 4540 rpm, respectively.

In some embodiment, step S4 further includes the following operations.

S41. Perform the steady test on the fuel cell system to obtain first heat dissipation capabilities of different test stands of the fuel cell system.

S42. Perform the dynamic test on the fuel cell system to obtain second heat dissipation capabilities of different test stands of the fuel cell system.

Figure 3:
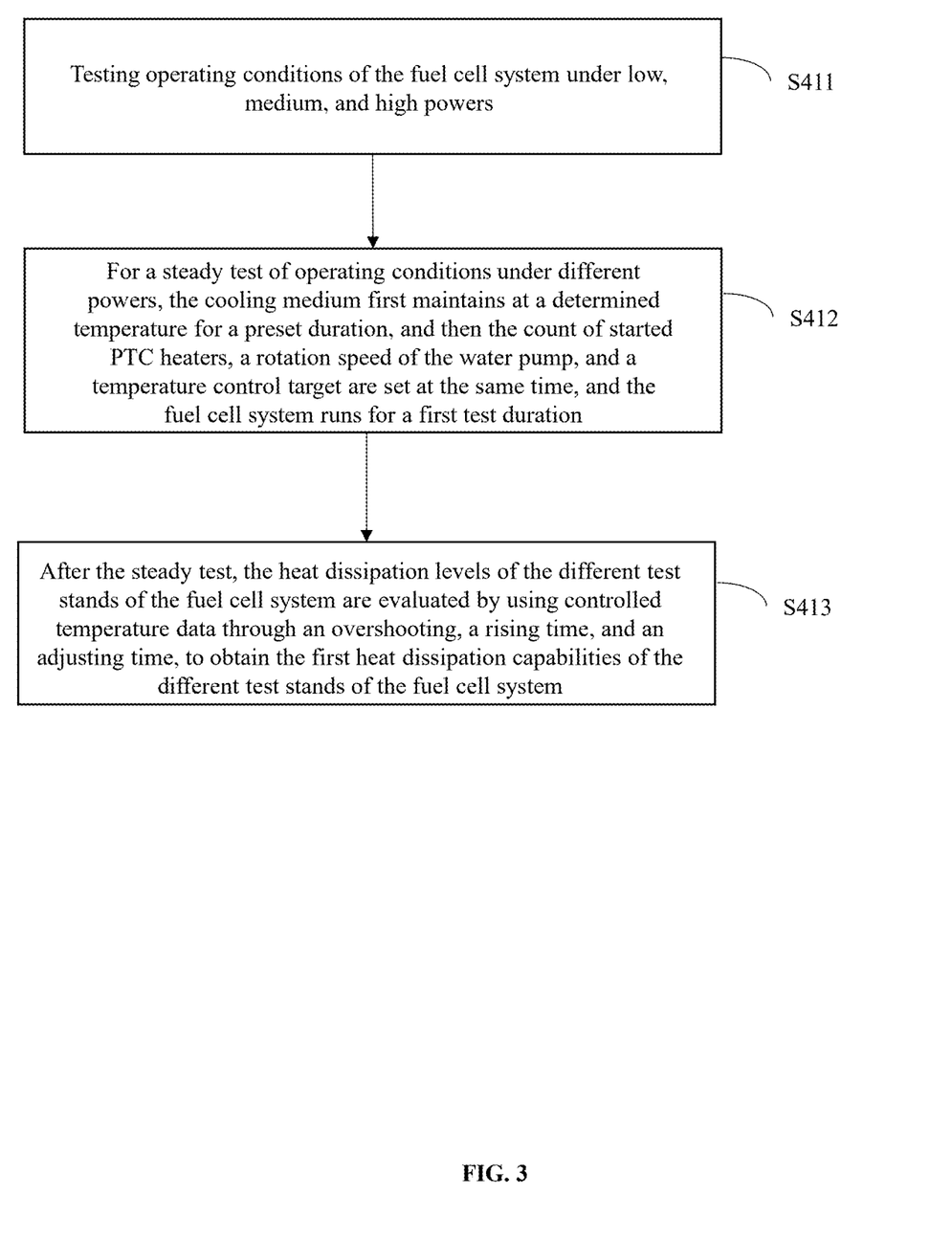
FIG. 3 is a flowchart of a second working process for evaluating a heat dissipation capability of a test platform of hydrogen fuel cell system according to some embodiments of the present disclosure.

In some embodiment, referring to FIG. 3, the step S41 further includes the following operations.

S411. Testing operating conditions of the fuel cell system under low, medium, and high powers.

S412. For the steady test of operating conditions under different powers, the cooling medium first maintains at a determined temperature for a preset duration, and then the count of started PTC heaters, a rotation speed of the water pump, and a temperature control target are set at the same time, and the fuel cell system runs for a first test duration. The preset duration maintained by the cooling medium and the first test duration may be specified manually based on experience. The temperature control target is the maximum temperature expected to be reached during the temperature measurement of the test stand of fuel cell system.

S413. After the steady test, the heat dissipation levels of the different test stands of the fuel cell system are evaluated by using controlled temperature data through an overshooting $\delta$, a rising time $t_a$, and an adjusting time $t_b$, to obtain the first heat dissipation capabilities of the different test stands of the fuel cell system. The controlled temperature data includes a maximum temperature in a temperature measurement phase at the inlet of device (e.g., the water inlet 2 of primary dissipation system or the water inlet 5 of the secondary dispersion system in FIG. 1) during the temperature measurement and an approaching temperature at the end of the test.

A specific representation of the overshooting $\delta$, the rising time $t_a$, and the adjusting time $t_b$ is as follows:

Overshooting: $\delta = |T_{max} - T_\infty|/T_\infty$ where, $T_{max}$ is the maximum temperature (in $^\circ$ C.) in the temperature measurement phase, and $T_\infty$ is the approaching temperature (in $^\circ$ C.) at the end of the steady test;

Rising time $t_a$: a time (in seconds) from start of adjustment to first reach a set value.

Adjusting time $t_b$: a time (in seconds) required from the start of adjustment to reach an acceptable error temperature band.

Continuing with the previous example, six PTC heaters are used to simulate the fuel cell engine during the experiment. Therefore, in a steady test, counts of started PTC heaters corresponding to low, medium, and high powers are 2, 4, and 6, respectively. In the dynamic test, step counts of PTC heaters under small, medium, and large variable load amplitudes are 1, 2 and 3, respectively. The step counts of PTC heaters represent the count of changes in the state (on or off) of the PTC heater for each load change in the dynamic test. The low temperature and high temperature in the test are 60° C. and 70° C., respectively.

In some embodiments, data required to be collected includes: a preset temperature, a temperature at the inlet of device, a temperature at the outlet of device, a flow rate of the cooling medium, and a total power of PTC heaters. The "temperature at the inlet of device" is a controlled temperature and is used to calculation of the evaluating index.

For example, three different test platforms of hydrogen fuel cell system are used to perform a temperature control in steady test under the medium-power. The target of temperature control is the high temperature 70 of ° C. In the example, the cooling medium is maintained at 25° C. for 1 minute, and then the count of started PTC heaters, the rotation speed of water pump, and the temperature control target are set at the same time and operated for 19 minutes. The whole process is 20 minutes. Table 1 shows the calculation result of the index of the steady test, where the acceptable error band in the adjusting time index is specified as +2° C. in the example.

TABLE 1

Indexes of steady test of the test platform of hydrogen fuel cell system, power control 70° C.

|  | Test platform A | Test platform B | Test platform C |
| --- | --- | --- | --- |
| Overshooting $\delta$ | 0.0619 | 0 | 0.1299 |
| Rising time $t_a$ (seconds) | 118 s | / | 108 s |
| Adjusting time $t_b$ (seconds) | 160 s | 193 s | 336 s |

For the test platform A, it starts the control at 60 s, and it first reaches the set value of 70° C. in 178 s. At 220 s, an acceptable error band is reached. For the test platform B, it starts the control at 60 s, and it does not reach the set temperature of 70° C. in the test of whole 20 minutes, and the final temperature fluctuates around 69.2° C. At 253 s, an acceptable error band is reached. For the test platform C, it starts the control at 60 s, and it first reaches the set value of 70° C. at 168 s. At 396 s, an acceptable error band is reached.

It can be seen from the test results that the test platform B does not reach the set temperature of 70° C. during the whole control process, and the final temperature fluctuates around 69.2° C. The whole process does not overshoot, but its adjusting time is longer than that of the test platform A. The rising time of test platform C is smaller than that of test platform A, but the difference is not large. It is only 10 s less. However, the overshooting and adjusting time are the largest, much larger than those of test platforms A and B.

Therefore, the test platform C has the worst control effect and the test platform A has the best control effect.

Figure 4:
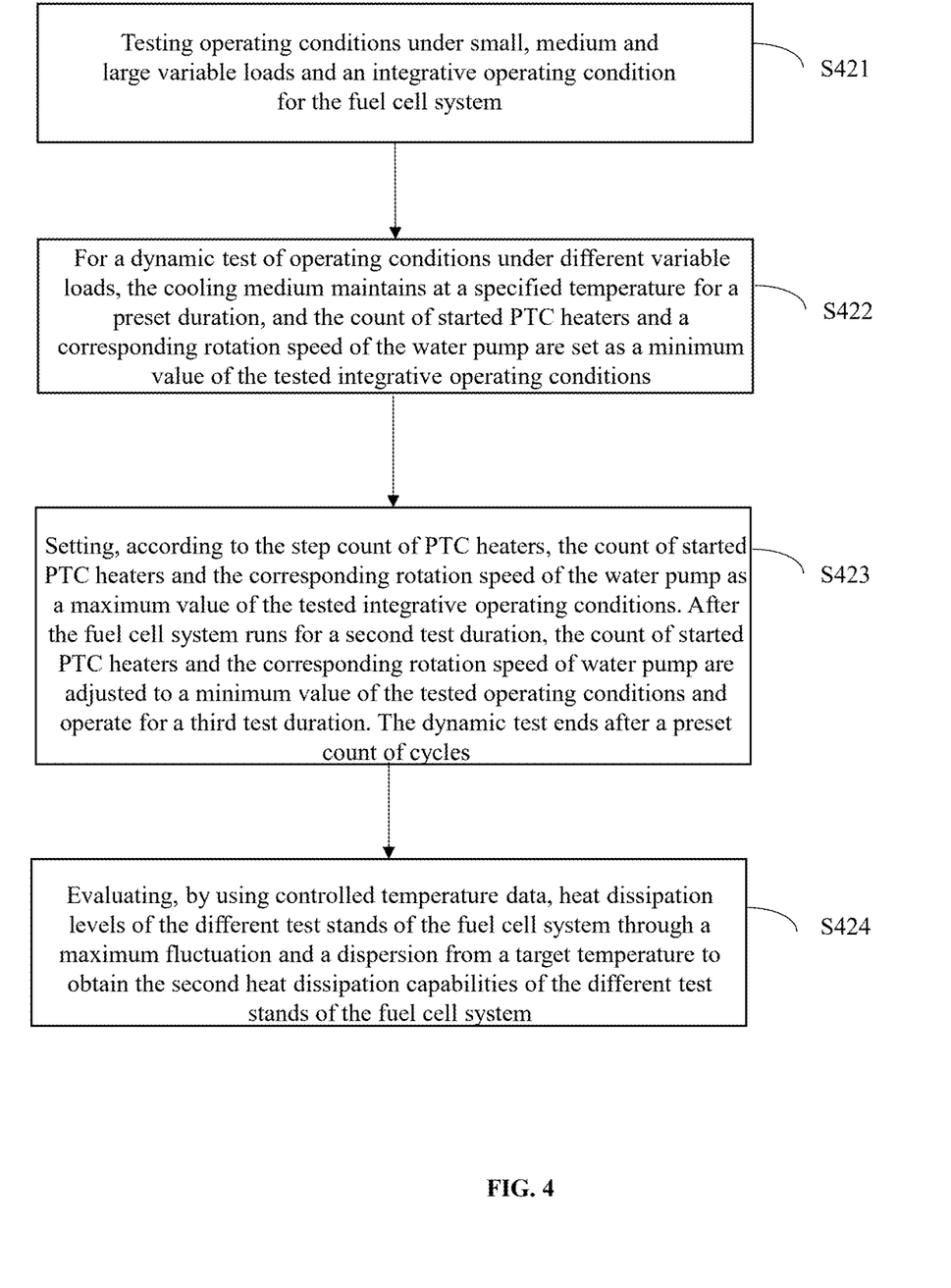
FIG. 4 is a flowchart of a third working process for evaluating a heat dissipation capability of a test platform of hydrogen fuel cell system according to some embodiments of the present disclosure.

In some embodiment, referring to FIG. 4, the step S42 further includes the following operations.

S421. Testing operating conditions under small, medium and large variable loads and an integrative operating condition for the fuel cell system. The power change rule of the tested integrative operating condition may be set according to the requirements of the user.

S422. For the dynamic test of operating conditions under different variable loads, the cooling medium maintains at a specified temperature for a preset duration, and the count of started PTC heaters and a corresponding rotation speed of the water pump are set as a minimum value of the tested integrative operating conditions.

S423. Setting, according to the step count of PTC heaters, the count of started PTC heaters and the corresponding rotation speed of the water pump as a maximum value of the tested integrative operating conditions. After the fuel cell system runs for a second test duration, the count of started PTC heaters and the corresponding rotation speed of water pump are adjusted to a minimum value of the tested operating conditions and operate for a third test duration. The dynamic test ends after a preset count of cycles. The preset count, the second test duration, and the third test duration may be specified manually based on experience.

S424. Evaluating, by using controlled temperature data, heat dissipation levels of the different test stands of the fuel cell system through a maximum fluctuation ΔT and a dispersion S from a target temperature to obtain the second heat dissipation capabilities of the different test stands of the fuel cell system.

A representation of the maximum fluctuation ΔT and the dispersion S from the target temperature is as follows:

Maximum fluctuation: $\Delta T = |T_{max} - T_{set}|$ wherein, $T_{max}$ is a maximum temperature (in ° C.) in a temperature measurement phase, and $T_{set}$ is a set target temperature (in ° C.).

Dispersion from the Target Temperature:

$$S = \sqrt{\frac{\sum_{i=0}^{n}(T - T_{set})^2}{n}}$$

wherein T is a real-time temperature (in ° C.) of each sampling point, $T_{set}$ is the set target temperature value (in ° C.), and n is a count of samples.

For example, three different test platforms of hydrogen fuel cell system are dynamically tested and temperature controlled under a large variable load amplitude. A temperature control target is low temperature of 60° C. In the example, a cooling medium is first maintained at 60° C. for 2 minutes when the count of started PTC heaters is 3 and the rotation speed of water pump is 3590 rpm, and then based on the step count of PTC heaters being 3, the count of started PTC heaters is set to 6, the corresponding rotation speed of water pump is set to 4540 rpm, and it runs for 30 s. Then, the count of started PTC heaters is adjusted to 3, and the corresponding rotation speed of water pump is adjusted to 3590 rpm. The cooling medium is cycled 10 times with 1 minute for a cycle. Table 2 shows the calculation results of indexes of dynamic test.

TABLE 2

Indexes of dynamic test of test platform of hydrogen fuel cell system, large variable load control 60° C.

|  | Test platform A | Test platform B | Test platform C |
|---|---|---|---|
| Maximum fluctuation ΔT(° C.) | 0.59 | 1.6 | 1.2 |
| Dispersion S | 0.2569 | 0.7908 | 0.6408 |

It can be seen from the test results that the maximum fluctuation and the dispersion from the target temperature of test platform A are the smallest. Therefore, the effect of large variable load control 60° C. of test platform A is better than that of B and C. The order of temperature control effect from good to bad is A>C>B.

In some embodiments, integrative test temperature control may be further performed on three different test platforms of hydrogen fuel cell system, and a temperature control target is high temperature of 70° C. Table 3 shows the calculation results of indexes of dynamic test.

TABLE 3

Indexes of integrative test of the test platform of hydrogen fuel cell system

|  | Test platform A | Test platform B | Test platform C |
|---|---|---|---|
| Maximum fluctuation ΔT(° C.) | 0.91 | 6.1 | 3.1 |
| Dispersion S | 0.2136 | 0.9796 | 1.0181 |

It can be seen from the test results that the maximum fluctuation and the dispersion from the target temperature of test platform A are the smallest. Therefore, the effect of the integrative test temperature control 70° C. of test platform A is better than that of B and C. It can be learned from the dispersion that the test platform B is more stable than C in the whole temperature control process, but the maximum temperature fluctuation reaches 6.1° C. Large temperature fluctuation can easily cause damage to the controlled device. Although the temperature control effect of test platform C is less stable than that of test platform B, the maximum temperature fluctuation is 3.1° C. This effect is acceptable. Therefore, the order of temperature control effect from good to bad is A>C>B.

Figure 5:
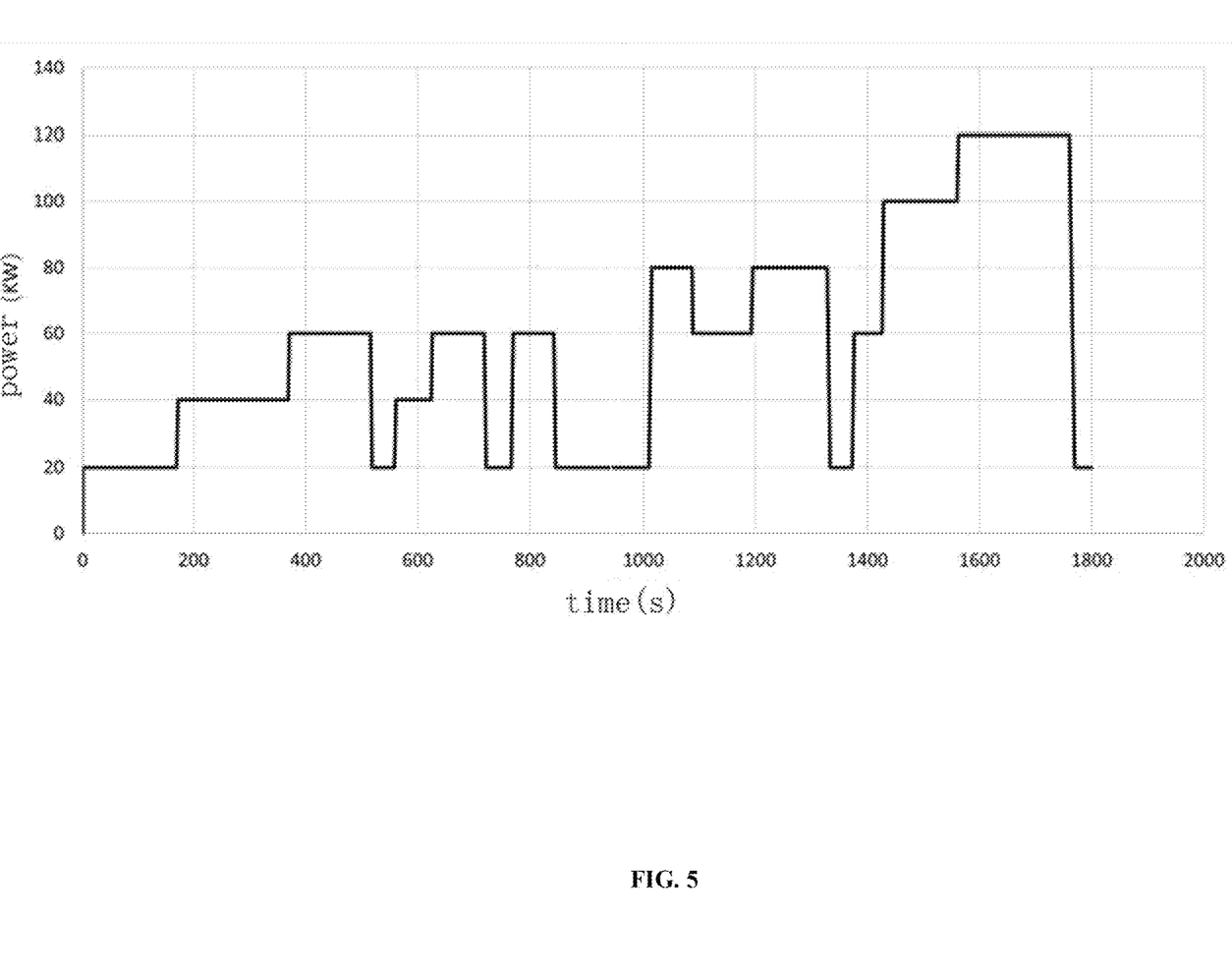
FIG. 5 is a schematic diagram of a power change of an integrative test in a method for evaluating a heat dissipation capability of a test platform of hydrogen fuel cell system according to some embodiments of the present disclosure.

In this integrative test, the power change rule is formulated by referring to the test method in the filed, as shown in FIG. 5. The horizontal axis in FIG. 5 represents the time, the vertical axis represents the power of the integrated test, and the curve represents the change curve of the power of the integrated test in chronological order.

Figure 6:
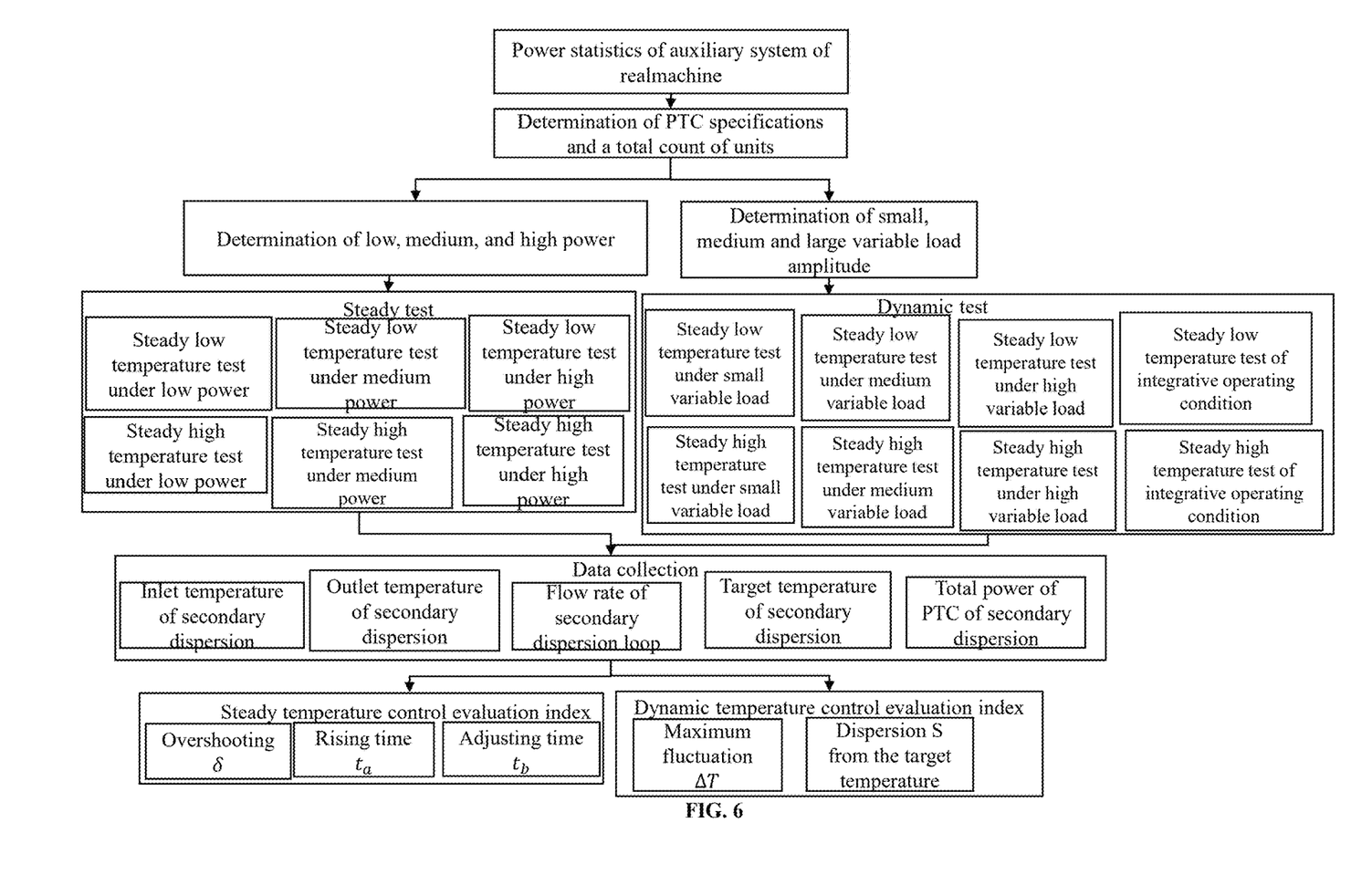
FIG. 6 is a flowchart of testing a heat dissipation capability of a secondary dispersion in a method for evaluating a heat dissipation capability of a test platform of hydrogen fuel cell system according to some embodiments of the present disclosure.

Referring to FIG. 6, in some embodiments, it may further test secondary heat dissipation capability of the test platform of fuel cell system. During the test, it is not required to determine a "water pump specification (the water pump comes with the test stand)", but a total power of an auxiliary system of the real-machine needs to be determined, and then the specification and the count of the PTC heaters are determined according to the total power.

During the test, all test items are completed with a constant flow value. The steady test, dynamic test, data collection, and temperature control evaluation are the same as the primary test.

By utilizing the method for evaluating the heat dissipation capacity of a test stand of hydrogen fuel cell system provided in the present disclosure, combined with the aforementioned device for evaluating the heat dissipation capacity of a test platform of hydrogen fuel cell system, it is possible to simulate the operation conditions under different powers and the operation conditions under different variable load amplitudes of the fuel cell system and to realize the testing of steady state, dynamic, and integrative operating conditions, thereby obtaining the heat dissipation capacity of different test stands of the fuel cell system.

A person skilled in the art can understand that various variations and improvements may occur to the content disclosed in the present disclosure. For example, various devices or components described above may be implemented by hardware, or may be implemented by software, firmware, or some or all combinations of the three.

A flowchart is used in this disclosure to describe the steps of the method according to the embodiments of the present disclosure. It should be understood that the preceding or subsequent steps are not necessarily performed in an exact order. On the contrary, various steps may be processed in reverse order or at the same time. In addition, other operations may be added to these processes.

The foregoing is a description of this disclosure and should not be considered a limitation. Although several exemplary embodiments of the present disclosure are described, those skilled in the art will readily appreciate that many modifications may be made to the exemplary embodiments without departing from the novel teachings and advantages of the present disclosure. Therefore, all such modifications are intended to be included within the scope of the present disclosure as defined in the claims. It should be understood that the foregoing descriptions of the present disclosure are not intended to be limited to the specific embodiments disclosed, and modifications to the disclosed embodiments and other embodiments are intended to be included within the scope of the appended claims. The present disclosure is defined by the claims and their equivalents.

What is claimed is:

1. A device for evaluating a heat dissipation capability of a test platform of a hydrogen fuel cell system, comprising:
   a test stand of a fuel cell system and a simulated heating device; wherein
   the test stand of the fuel cell system includes a primary test stand of the fuel cell system, a water inlet of a primary dispersion system, a water outlet of the primary dispersion system, a water outlet of a secondary dispersion system, and a water inlet of the secondary dispersion system;
   the simulated heating device includes a liquid transmission pipeline, a water pump, a plurality of PTC heaters, a relay power supply, one or more switches, an electrical signal transmission line, a plurality of electromagnetic relays, a PTC power supply, and an expansion water tank;
   the device for evaluating a heat dissipation capability is configured to perform a primary heat dissipation capability test and a secondary heat dissipation capability test;
   when the primary heat dissipation capability test is performed,
      a cooling medium is supplied to the PTC heaters through the liquid transmission pipeline by the water pump and is heated, the heated cooling medium is transferred to the water inlet of the primary dispersion system of the test stand of the fuel cell system through the liquid transmission pipeline, and is heat-dissipated by the primary dispersion system of the primary test stand of the fuel cell system, wherein in a primary dispersion water channel, gas is removed from the water channel and a water level warning is provided through a branch water channel of the expansion water tank;
   when the secondary heat dissipation capability test is performed,
      the cooling medium is supplied to the PTC heaters through the liquid transmission pipeline by a built-in water pump in the primary test stand of the fuel cell system and is heated, wherein the heated cooling medium is transferred to the water inlet of the secondary dispersion system through the liquid transmission pipeline, and is heat-dissipated by the secondary dispersion system of the primary test stand of the fuel cell system;
   wherein the PTC heaters in the primary heat dissipation capability test and the secondary heat dissipation capability test are powered by the PTC power supply;
   the PTC heaters, the PTC power supply, and the electromagnetic relays are connected in series;
   wherein the switches control on/off of the electromagnetic relays to determine whether the PTC heaters work and whether the cooling medium is heated; and
   each of the plurality of PTC heaters is provided with one switch and one electromagnetic relay, so as to independently control the PTC heater;
   wherein the plurality of PTC heaters which are connected in series or in parallel simulate the fuel cell system with different heating powers, and operating states of the plurality of PTC heaters are controlled by using the switches to simulate operating conditions under low, medium, and high powers and operating conditions under small, medium, and large variable load amplitudes for the fuel cell system.

2. A method for evaluating a heat dissipation capability of a test platform of a hydrogen fuel cell system, wherein the method is applied to the device for evaluating a heat dissipation capability of a test platform of a hydrogen fuel cell system according to claim 1, the method comprising:
   determining a PTC heater specification, a total count of PTC heaters, and a pump specification according to a rated power of the fuel cell system and a true flow rate of cooling medium when the fuel cell system is operating at the rated power; and
   classifying rotation speeds of the water pump by taking a minimum rotation speed of real machine of the water pump and a specified rated rotation speed as limitations to obtain a plurality of classes, wherein the count of classes is equal to the total count of PTC heaters, to obtain rotation speeds of the water pump corresponding to different counts of started PTC heaters;
   determining, according to a total count of started PTC heaters, counts of started PTC heaters under low, medium, and high powers, and step counts of PTC heaters under small, medium, and large variable load amplitudes; and
   performing a steady test and a dynamic test on the fuel cell system to obtain heat dissipation capabilities of different test stands of the fuel cell system.

3. The method for evaluating a heat dissipation capability of a test platform of hydrogen fuel cell system according to claim 2, wherein determining the PTC heater specification, the total count of PTC heaters, and the pump specification according to the rated power of the fuel cell system and the true flow rate of cooling medium when the fuel cell system is operating at the rated power further includes:
- determining the PTC heater specification and the total count of PTC heaters according to the rated power of the fuel cell system; and
- determining the water pump specification according to the true flow rate of the cooling medium when the fuel cell system is operating at the rated power.

4. The method for evaluating a heat dissipation capability of a test platform of hydrogen fuel cell system according to claim 3, wherein determining the PTC heater specification and the total count of PTC heaters according to the rated power of the fuel cell system further includes:
- obtaining the rated power of the fuel cell system, and obtaining a plurality of reference specifications of the PTC heaters;
- using N first PTC heaters of a first specification, wherein a heating power of the first PTC heaters is M; and
  - a value of N*M is greater than or equal to the rated power of the fuel cell system;
- determining the water pump specification according to the true flow rate of the cooling medium when the fuel cell system is operating at the rated power further includes:
- obtaining a range of flow rate when the fuel cell system is under the rated power and a temperature difference between an inlet and an outlet is a preset temperature difference value, and selecting a water pump of second specification from water pumps of reference specification; wherein
- a rated flow rate of the water pump of second specification is between a minimum value and a maximum value of the range of flow rate when the fuel cell system is under the rated power and the temperature difference between the inlet and the outlet is the preset temperature difference value.

5. The method for evaluating a heat dissipation capability of a test platform of hydrogen fuel cell system according to claim 2, wherein classifying the rotation speeds of the water pump by taking the minimum rotation speed of real machine of the water pump and the specified rated rotation speed as limitations to obtain the plurality of classes, wherein the count of classes is equal to the total count of PTC heaters, to obtain the rotation speeds of the water pump corresponding to different counts of started PTC heaters further includes:
- according to a specified minimum rotation speed A of the water pump and a specified rated rotation speed B, setting that the water pump supplies a stable flow rate when an actual rotation speed of the water pump on a rack is greater than or equal to p*A and less than B, wherein p is a real number greater than or equal to 1; and
- classifying the rotation speeds within an actual rotation speed range of the water pump, wherein the count of classes is equal to the total count of PTC heaters, to obtain the rotation speeds of the water pump corresponding to different counts of started PTC heaters.

6. The method for evaluating a heat dissipation capability of a test platform of hydrogen fuel cell system according to claim 2, wherein performing the steady test and the dynamic test on the fuel cell system to obtain the heat dissipation capabilities of different test stands of the fuel cell system further includes:
- performing the steady test on the fuel cell system to obtain first heat dissipation capabilities of the different test stands of the fuel cell system; and
- performing the dynamic test on the fuel cell system to obtain second heat dissipation capabilities of the different test stands of the fuel cell system.

7. The method for evaluating a heat dissipation capability of a test platform of hydrogen fuel cell system according to claim 6, wherein performing the steady test on the fuel cell system to obtain the first heat dissipation capabilities of the different test stands of the fuel cell system further includes:
- testing operating conditions of the fuel cell system under low, medium, and high powers; wherein
  - for the steady test of operating conditions under different powers, the cooling medium first maintains at a determined temperature for a preset duration, and then the count of started PTC heaters, a rotation speed of the water pump, and a temperature control target are set at the same time, and the fuel cell system runs for a first test duration;
- after the steady test, evaluating, by using controlled temperature data, heat dissipation levels of the different test stands of the fuel cell system through an overshooting $\delta$, a rising time $t_a$, and an adjusting time $t_b$, to obtain the first heat dissipation capabilities of the different test stands of the fuel cell system; wherein
  - a specific representation of the overshooting $\delta$, the rising time $t_a$, and the adjusting time $t_b$ is as follows:

the overshooting: $\delta = |T_{max} - T_\infty|/T_\infty$ wherein, $T_{max}$ is a maximum temperature (in ° C.) in a temperature measurement phase, and $T_\infty$ is an approaching temperature (in ° C.) at an end of the steady test;
the rising time $t_a$: a time (in seconds) from start of adjustment to first reach a set value; and
the adjusting time $t_b$ a time (in seconds) required from the start of adjustment to reach an acceptable error temperature band.

8. The method for evaluating a heat dissipation capability of a test platform of hydrogen fuel cell system according to claim 6, wherein performing the dynamic test on the fuel cell system to obtain the second heat dissipation capabilities of the different test stands of the fuel cell system further includes:
- testing operating conditions under small, medium and large variable loads and an integrative operating condition for the fuel cell system, wherein a power change rule of the tested integrative operating condition is set according to requirements of a user;
- for the dynamic test of operating conditions under different variable loads, the cooling medium maintains at a specified temperature for a preset duration, and the count of started PTC heaters and a corresponding rotation speed of the water pump are set as a minimum value of the tested operating conditions;
- setting, according to the step count of PTC heaters, the count of started PTC heaters and the corresponding rotation speed of the water pump as a maximum value of the tested operating conditions, wherein after the fuel cell system runs for a second test duration, the count of started PTC heaters and the corresponding rotation speed of the water pump are adjusted to a minimum value of the tested operating conditions and operate for a third test duration, the dynamic test ends after a preset count of cycles; and
- evaluating, by using controlled temperature data, heat dissipation levels of the different test stands of the fuel cell system through a maximum fluctuation $\Delta T$ and a dispersion S from a target temperature to obtain the second heat dissipation capabilities of the different test stands of the fuel cell system; wherein a representation of the maximum fluctuation $\Delta T$ and the dispersion S from the target temperature is as follows:

the maximum fluctuation: $\Delta T = |T_{max} - T_{set}|$ wherein, $T_{max}$ is a maximum temperature (in ° C.) in a temperature measurement phase, and $T_{set}$ is a set target temperature (in ° C.);

the dispersion from the target temperature:

$$S = \sqrt{\frac{\sum_{i=0}^{n}(T - T_{set})^2}{n}}$$

wherein T is a real-time temperature (in ° C.) of each sampling point, $T_{set}$ is the set target temperature value (in ° C.), and n is a count of samples.

* * * * *